(12) United States Patent
Kitamura et al.

(10) Patent No.: US 10,723,807 B2
(45) Date of Patent: Jul. 28, 2020

(54) METHOD FOR PRODUCING HYDROXYALKYL ALKYL CELLULOSE

(71) Applicant: SHIN-ETSU CHEMICAL CO., LTD., Tokyo (JP)

(72) Inventors: Akira Kitamura, Joetsu (JP); Mitsuo Narita, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 19 days.

(21) Appl. No.: 15/921,146

(22) Filed: Mar. 14, 2018

(65) Prior Publication Data

US 2018/0282436 A1    Oct. 4, 2018

(30) Foreign Application Priority Data

Mar. 31, 2017    (JP) .................................. 2017-71442

(51) Int. Cl.
*C08B 11/02*    (2006.01)
*D21C 9/00*    (2006.01)
*C08B 11/193*    (2006.01)

(52) U.S. Cl.
CPC ............ *C08B 11/02* (2013.01); *C08B 11/193* (2013.01); *D21C 9/004* (2013.01)

(58) Field of Classification Search
None
See application file for complete search history.

(56) References Cited

U.S. PATENT DOCUMENTS

| 2003/0065165 | A1 | 4/2003 | Dannhorn et al. |
| 2004/0127700 | A1* | 7/2004 | Schlesiger ............ C08B 11/00 536/95 |
| 2015/0057358 | A1* | 2/2015 | Brackhagen ......... A61K 9/2054 514/629 |
| 2015/0273062 | A1 | 10/2015 | Moddelmog et al. |

FOREIGN PATENT DOCUMENTS

| EP | 1803738 A1 | 7/2007 |
| EP | 3031828 A1 | 6/2016 |
| JP | 2003-96102 A | 4/2003 |
| JP | 2009-522394 A | 6/2009 |
| JP | 2015-512421 A | 4/2015 |
| WO | 2007/078015 A1 | 7/2007 |
| WO | 2012/051034 A1 | 4/2012 |
| WO | 2012/122279 A1 | 9/2012 |
| WO | 2013/154977 A1 | 10/2013 |
| WO | 2014/039966 A2 | 3/2014 |
| WO | 2014/062379 A1 | 4/2014 |

OTHER PUBLICATIONS

Jul. 26, 2018 European Search Report issued in European Patent Application No. 18164644.9.
Japanese Pharmacopoeia Sixteenth Edition, The Ministry of Health, Labour and Welfare Ministerial Notification No. 65, pp. 939-1098, Mar. 24, 2011.

* cited by examiner

Primary Examiner — Dale R Miller
(74) Attorney, Agent, or Firm — Oliff PLC

(57) ABSTRACT

Provided is a method for producing a hydroxyalkyl alkyl cellulose having high thermal gel strength while suppressing a reduction in thermal gelation temperature. More specifically, provided is a method for producing a hydroxyalkyl alkyl cellulose including steps of: mixing cellulose pulp with a first alkali metal hydroxide solution to obtain alkali cellulose, reacting the alkali cellulose with an alkylating agent and a hydroxyalkylating agent to obtain a first reaction product mixture, adding a second alkali metal hydroxide solution to the first reaction product mixture without further adding any of alkylating and hydroxyalkylating agents to obtain a second reaction product mixture, and subjecting the second reaction product mixture to purification to obtain a hydroxyalkyl alkyl cellulose.

8 Claims, No Drawings

METHOD FOR PRODUCING HYDROXYALKYL ALKYL CELLULOSE

BACKGROUND OF THE INVENTION

1. Field of the Invention

The present invention relates to a method for producing a hydroxyalkyl alkyl cellulose having high thermal gel strength without reducing a thermal gelation temperature.

2. Related Art

Cellulose ethers such as methyl cellulose and hydroxypropyl methyl cellulose are used for processed foods to enhance shape retention of heated foods by making use of their properties of gelling when heated, that is, thermally reversible gelation properties.

Methyl cellulose is superior in thermal gel strength to hydroxypropyl methyl cellulose, but due to a thermal gelation temperature (of 2% by weight aqueous solution) as low as 50 to 60° C., it is still a gel at the food temperature of 50 to 65° C. for eating so that it has a possibility of providing a solid texture. In addition, in preparing its solution, methyl cellulose cannot be dissolved completely unless it is cooled once to 15° C. or less, so that it takes time to prepare the solution.

On the other hand, hydroxypropyl methyl cellulose has a thermal gelation temperature of from 60 to 80° C., which is relatively higher than that of methyl cellulose so that it has a little possibility of providing a solid texture. In preparing its solution, since it can be dissolved at 25° C. or more, cooling operation is not necessary and it does not take time to prepare the solution. Because of the above-described reasons, hydroxypropyl methyl cellulose having a high gelation temperature is preferred to enhance the shape retention of foods during heating and avoid providing a solid texture.

However, hydroxypropyl methyl cellulose to be added to foods is inferior in thermal gel strength to methyl cellulose. Thus, there is a demand for hydroxypropyl methyl cellulose having high thermal gel strength.

To obtain hydroxypropyl methyl cellulose having high thermal gel strength, various methods with regards to a step of alkalizing cellulose pulp with an alkali metal hydroxide solution and division of an etherification reaction step into a plurality of stages have been proposed.

For example, there is a method for producing a cellulose ether in which after first-stage alkalization, a methylating agent and a hydroxyalkylating agent are added for an etherification reaction, and then a second-stage alkalizing agent is gradually added for an further etherification reaction to obtain the cellulose ether (JP 2015-512421T, which is the Japanese phase publication of WO 2013/154977).

There is another method for producing an alkylhydroxy alkyl cellulose in which first-stage alkalization is carried out in the presence of a suspending solvent containing an alkylating agent, then a hydroxyalkylating agent is added thereto, and after allowing the sufficient reaction, a second-stage alkali metal hydroxide solution is added thereto and the resulting mixture is mixed sufficiently to obtain the alkylhydroxy alkyl cellulose (JP 2003-96102A).

There is still another method for producing a hydroxyalkyl alkyl cellulose at a high reaction efficiency of an etherifying agent in which after first-stage alkalization, an alkyl halide and an alkylene oxide are added for etherification reaction, the reaction is allowed to proceed sufficiently, and a second-stage alkali metal hydroxide solution is added and followed by addition of an alkyl halide again for an etherification reaction to obtain the hydroxyalkyl alkyl cellulose (JP 2009-522394T, which is the Japanese phase publication of WO 2007/078015).

SUMMARY OF THE INVENTION

When the hydroxypropyl methyl cellulose is produced by the method disclosed in JP 2015-512421T, it has high thermal gel strength, but has a thermal gelation temperature deceased to about 60° C. and becomes almost similar to that of the thermal gelation temperature of methyl cellulose. Thus, it still remains gel-like at the temperature (50 to 65° C.) of food to be taken and has a possibility of providing a solid texture.

On the other hand, when hydroxypropyl methyl cellulose having a degree of substitution (DS) with methoxy groups of more than 1.8 is produced by a method comprising the two steps of alkalization as described in JP 2003-96102A, it has improved thermal gel strength, but has a thermal gelation temperature decreased in the same manner as in JP 2015-512421T.

When the hydroxypropyl methyl cellulose is produced by a method comprising two steps of alkalization and two steps of etherification as described in JP 2009-522394T, it inevitably has a thermal gelation temperature decreased in the same manner as in JP 2015-512421T.

Thus, the hydroxypropyl methyl cellulose produced by the methods described in JP 2015-512421T, JP 2003-96102A, and JP 2009-522394T requires time to return to a solution again when naturally cooled after thermal gelation, so that it still remains gel-like and provides an unfavorable solid texture when the food is taken.

There is therefore a demand for a method of producing hydroxypropyl methyl cellulose having high thermal gel strength while suppressing reduction in the thermal gelation temperature.

With a view to achieving the above-described object, the inventors have carried out an extensive investigation. As a result, it has been found that a hydroxyalkyl alkyl cellulose having high thermal gel strength with reduction of the thermal gel temperature suppressed can be produced by a method comprising a step of mixing with a first alkali metal hydroxide, another step of mixing with a second alkali metal hydride, and one step of mixing with an alkylating agent and a hydroxyalkylating agent wherein an amount and a certain ratio of the first alkali metal hydroxide is adjusted, leading to the invention.

In one aspect of the invention, there is provided a method of producing a hydroxyalkyl alkyl cellulose, comprising steps of: mixing cellulose pulp with a first alkali metal hydroxide solution to obtain alkali cellulose, reacting the alkali cellulose with an alkylating agent and a hydroxyalkylating agent to obtain a first reaction product mixture, adding a second alkali metal hydroxide solution to the first reaction product mixture without further adding any of alkylating and hydroxyalkylating agents to obtain a second reaction product mixture, and subjecting the second reaction product mixture to purification to obtain a hydroxyalkyl alkyl cellulose, wherein a mole ratio of a first alkali metal hydroxide in the first alkali metal hydroxide solution to cellulose in the cellulose pulp (first alkali metal hydroxide/cellulose) is from 3.7 to 4.7, and a ratio of weight of the first alkali metal hydroxide to total weight of the first alkali metal hydroxide and a second alkali metal hydroxide in the first and second alkali metal hydroxide solutions is from 0.75 to 0.93.

A hydroxyalkyl alkyl cellulose having high thermal gel strength with reduction of the thermal gelation temperature suppressed can be produced.

DETAILED DESCRIPTION OF THE PREFERRED EMBODIMENTS

The cellulose pulp is, for example, wood pulp or linter pulp, and is the same material as a starting material for producing a conventional cellulose ether. The intrinsic viscosity serving as an index of the degree of polymerization of the cellulose pulp can be selected appropriately depending on the intended viscosity of an aqueous solution of cellulose ether. The intrinsic viscosity at 25° C. is preferably from 600 to 2500 ml/g, more preferably from 600 to 1600 ml/g. The intrinsic viscosity of cellulose pulp can be determined in accordance with Method A of JIS P8215.

The cellulose pulp contains cellulose and water. The amount of "cellulose in cellulose pulp" described in the specification means solid content in the cellulose pulp, excluding water content therein. It can be measured in accordance with Method A of JIS P8215. The term "cellulose in cellulose pulp" as used in the specification means cellulose in raw material cellulose pulp unless otherwise particularly noted. The cellulose having n anhydroglucose units $(C_6H_{10}O_5)_n$ is called to be of n moles.

The cellulose pulp is preferably in a form of powder obtained by pulverizing the cellulose pulp with a pulverizer. The pulp pulverizer is not particularly limited insofar as it can pulverize cellulose pulp into a powder. Examples of the pulverizer may include a knife mill, a cutting mill, a hammer mill, a ball mil, and a vertical roller mill. The cellulose pulp powder has a weight average particle size $D_{50}$ of preferably from 30 to 400 µm. The weight average particle size $D_{50}$ of the cellulose pulp powder is determined as a particle size at 50% in the cumulative distribution by using Ro-Tap sieve shaker containing a plurality of test sieves with different opening sizes in accordance with JIS Z8801. More specifically, the pulp powder is placed on the top sieve, and vibrated or tapped to sift the powder, and weight of residue on each sieve and weight of power at the bottom are measured to find a weight distribution.

First, the step of mixing cellulose pulp with a first alkali metal hydroxide solution to obtain alkali cellulose is described.

The alkali metal hydroxide solutions are mixed in two steps in such a manner that a first alkali metal hydroxide solution is mixed in a first step and a second alkali metal hydroxide solution is mixed in a second step. The kind of the alkali metal hydroxide solution is not particularly limited. Examples of the alkali metal hydroxide solution include a solution of sodium hydroxide or potassium hydroxide. An aqueous solution of sodium hydroxide is preferred from the economic standpoint. It is preferable to use the same kind of material, for example, sodium hydroxide used as the first alkali metal hydroxide in the first alkali metal hydroxide solution and the second alkali metal hydroxide in the second alkali metal hydroxide solution. However, it is possible to use different kinds of materials, for example, sodium hydroxide used as the first alkali metal hydroxide and potassium hydroxide used as the second alkali metal hydroxide.

The alkali metal hydroxide solution is mixed preferably through addition of the alkali metal hydroxide solution to the cellulose pulp. Examples of the addition include direct dropwise addition of the alkali metal hydroxide solution to the cellulose pulp, and spraying of the alkali metal hydroxide solution to the cellulose pulp. The spraying is preferable because the alkali cellulose thus obtained is excellent in uniformity.

The concentration of the alkali metal hydroxide in the alkali metal hydroxide solution is preferably from 10 to 60% by weight, more preferably from 30 to 50% by weight, from the standpoint of etherification reaction efficiency and handling ease. It is preferable to use the first and the second alkali metal hydroxide having the same concentrations, but it is possible to use the first and the second alkali metal hydroxide having the different concentrations.

The step of mixing the cellulose pulp with the alkali metal hydroxide solution is carried out preferably in a reactor with internal stirring. The reactor is preferably equipped with a measuring instrument capable of measuring the inside temperature.

Before mixing the first alkali metal hydroxide solution with the cellulose pulp, it is preferable to remove oxygen in the reactor by a vacuum pump or the like and replace it with an inert gas, preferably nitrogen in order to suppress depolymerization which can occur in the presence of the alkali metal hydroxide and oxygen.

The amount of the first alkali metal hydroxide solution to be used is, as a mole ratio of the first alkali metal hydroxide to the cellulose in the cellulose pulp (first alkali metal hydroxide/cellulose), from 3.7 to 4.7, preferably from 3.7 to 4.6, more preferably from 3.7 to 4.5. When the mole ratio of the first alkali metal hydroxide to the cellulose is less than 3.7, the produced hydroxyalkyl alkyl cellulose has an excessively reduced thermal gelation temperature and provides a solid texture because it still remains gel-like at the temperature of food to be taken. When the mole ratio is more than 4.7, the produced hydroxyalkyl alkyl cellulose cannot have high thermal gel strength.

The weight ratio of the first alkali metal hydroxide to the total of the first and second alkali metal hydroxides is from 0.75 to 0.93, preferably from 0.75 to 0.91, more preferably from 0.75 to 0.90. When the weight ratio is less than 0.75, the produced hydroxyalkyl alkyl cellulose has a reduced thermal gelation temperature and provides a solid texture because it still remains gel-like at the temperature of food to be taken. When the weight ratio is more than 0.93, the produced hydroxyalkyl alkyl cellulose cannot have high thermal gel strength.

The internal temperature of the reactor at the time of mixing the cellulose pulp with the first alkali metal hydroxide, preferably the internal temperature of the reactor at the time of adding the first alkali metal hydroxide solution to the cellulose pulp is preferably from 10 to 80° C., more preferably from 30 to 70° C. from the standpoint of obtaining uniform alkali cellulose.

The addition rate of the first alkali metal hydroxide in the first alkali metal hydroxide solution is expressed by a mole amount of the first alkali metal hydroxide to be added per hour per mole of the cellulose in the cellulose pulp. It is preferably from 1.5 to 48.0 [mol/mol·hr], more preferably from 4.8 to 30.0 [mol/mol·hr], still more preferably from 8 to 20.0 [mol/mol·hr], from the standpoint of uniformly mixing the first alkali metal hydroxide solution in the system.

After addition of the first alkali metal hydroxide solution, mixing with stirring may be continued for further 5 to 30 minutes to obtain the alkali cellulose in more uniform state.

In order to suppress regional heat generation in the reactor, an organic solvent inert to the alkylation reaction such as dimethyl ether may be added to the system before, during or after addition of the first alkali metal hydroxide solution. The weight ratio of the organic solvent to the cellulose in cellulose pulp is preferably from 0.1 to 0.8.

Then, the alkali cellulose thus obtained is reacted with an alkylating agent and a hydroxyalkylating agent to obtain a first reaction product mixture.

Examples of the alkylating agent include a methylating agent such as methyl chloride, dimethyl sulfate and methyl iodate; and an ethylating agent such as ethyl chloride, diethyl sulfate and ethyl iodide. The methyl chloride is preferable from the standpoint of thermal gel strength of the hydroxyalkyl alkyl cellulose thus obtained and also from the economic standpoint.

Examples of the hydroxyalkylating agent include ethylene oxide, propylene oxide and butylene oxide. The propylene oxide is preferable from the standpoint of thermal gel strength of the hydroxyalkyl alkyl cellulose thus obtained and also from the economic standpoint.

When the alkali cellulose is reacted with the alkylating agent and the hydroxyalkylating agent, the internal temperature of the reactor is preferably from 40 to 90° C., more preferably from 50 to 80° C. from the standpoint of reaction control.

Regarding the mole amount of the alkylating agent to be added, a mole ratio of the alkylating agent to the total of the first and second alkali metal hydroxides (alkylating agent/total alkali metal hydroxides) is preferably from 0.8 to 1.5, more preferably from 1.0 to 1.3. When the mole ratio of the alkylating agent to the total of the alkali metal hydroxides is less than 0.8, replacement by the alkyl groups may be insufficient. When the mole ratio is more than 1.5 and an excessive amount of the alkylating agent is used, economical disadvantage may be brought.

Regarding the mole amount of the hydroxyalkylating agent to be added, a mole ratio of the hydroxyalkylating agent to the cellulose in cellulose pulp (hydroxyalkylating agent/cellulose) is preferably from 0.5 to 2.0, more preferably from 0.5 to 1.7. When the molar ratio of the hydroxyalkylating agent to the cellulose is less than 0.5, an excessive decrease of the thermal gelation temperature may be caused. When the mole ratio is more than 2.0 and an excessive amount of the alkylating agent issued, the lowered thermal gel strength and economical disadvantage may be brought.

Regarding the addition of the alkylating agent and the hydroxyalkylating agent, the alkylating agent and the hydroxyalkylating agent are preferably added to the alkali cellulose. Regarding the order of the addition of the alkylating agent and the hydroxyalkylating agent, the addition of the alkylating agent may be started before, during or after the start of the addition of the hydroxyalkylating agent. The addition of the alkylating agent is started preferably before or during the start of the addition of the hydroxyalkylating agent from the standpoint of the productivity.

The alkylating agent is added preferably for from 30 to 120 minutes, more preferably from 40 to 90 minutes from the standpoint of the reaction control and productivity.

The hydroxyalkylating agent is added preferably for from 5 to 30 minutes, more preferably from 10 to 30 minutes from the standpoint of the reaction control and productivity.

The first reaction product mixture thus obtained may be directly subjected to addition of the second alkali metal hydroxide solution. Alternatively, before it is subjected to addition of the second alkali metal hydroxide solution, it may be optionally subjected to purification to obtain a hydroxyalkyl alkyl cellulose in the same manner as in conventional purification of a crude hydroxyalkyl alkyl cellulose. For example, the purification comprises steps of: mixing the first reaction product mixture with water of from 60 to 100° C. in a stirring vessel to dissolve a salt generated as a by-product during the reaction, and subjecting a suspension discharged from the stirring vessel to a separating operation to remove the salt.

The hydroxyalkyl alkyl cellulose in the first reaction product mixture has a degree of substitution (DS) with alkoxy groups of preferably from 0.75 to 1.68, more preferably from 0.81 to 1.68, still more preferably from 0.99 to 1.37 from the standpoint of achieving desired thermal gel strength and thermal gelation temperature. It has a molar substitution (MS) with hydroxyalkoxy groups of preferably from 0.03 to 0.28, more preferably from 0.05 to 0.25 from the standpoint of desired thermal gel strength and thermal gelation temperature. The term "DS (Degree of Substitution)" means an average number of hydroxyl groups substituted with alkoxy groups per glucose ring unit of the cellulose, while the term "MS (Molar Substitution)" means an average mole number of hydroxyl groups substituted with hydroxyalkoxy groups per glucose ring unit of the cellulose.

Then, the second alkali metal hydroxide solution is added to and mixed with stirring with the first reaction product mixture after the alkylation and hydroxyalkylation without further adding any of alkylating and hydroxyalkylating agents for mixing with stirring to obtain a second reaction product mixture.

The time of starting the addition of the second alkali metal hydroxide solution to the first reaction product mixture is preferably after completion of the addition of 80% by weight or more of the total amount of the alkylating agent to be added and completion of the addition of all of the hydroxyalkylating agent; more preferably after completion of the addition of all of the alkylating agent and completion of the addition of all of the hydroxyalkylating agent. When the addition of the second alkali metal hydroxide solution is started before completion of 80% by weight or more of the total amount of the alkylating agent to be added, the hydroxyalkyl alkyl cellulose thus obtained may not have high thermal gel strength.

When the second alkali metal hydroxide solution is added to the first reaction product mixture after completion of the addition of the alkylating agent and completion of the addition of the hydroxyalkylating agent, the second alkali metal hydroxide solution is added at the time when the reacted percentage of the alkylating agent added is preferably from 25 to 75% by weight, more preferably from 35 to 65% by weight and the reacted percentage of the hydroxyalkylating agent added is preferably from 40 to 95% by weight, more preferably from 45 to 95% by weight.

The reacted percentage may be determined from the following equation by collecting all the amount of the first reaction product mixture during the reaction, and measuring the remaining weights of the alkylating agent and the hydroxyalkylating agent based on gas chromatography (GC) analysis.

Reacted percentage (%)={1−(remaining weight/charged amount)}×100

By changing the mole ratio of the first alkali metal hydroxide to the cellulose, addition amounts of the alkylating agent and the hydroxyalkylating agent, and the internal temperature during the reaction, and determining a reacted percentage per time unit based on the above equation, chemical kinetic equations of the alkylating agent and the hydroxyalkylating agent are established. Then, simulation is made using the resulting chemical kinetic equations to determine the timing of the addition of the second alkali metal hydroxide solution for desired reacted percentages.

Regarding the amount of the second alkali metal hydroxide in the second alkali metal hydroxide solution, a mole ratio of the second alkali metal hydroxide to the cellulose in cellulose pulp (the second alkali metal hydroxide/cellulose) is preferably from 0.15 to 1.85, more preferably from 0.20 to 1.6. When the mole ratio of the second alkali metal hydroxide to the cellulose is less than 0.15, a hydroxyalkyl alkyl cellulose having high thermal gel strength may not be produced. When the molar ratio is more than 1.85, the resulting alkyl cellulose may have the excessively lowered thermal gelation temperature, remain gel-like at the temperature of food to be taken, and provide a solid texture.

The internal temperature of the reactor at the time of starting addition of the second alkali metal hydroxide solution to the first reaction product mixture is preferably from 65 to 90° C., more preferably from 70 to 85° C., still more preferably from 75 to 85° C. When the internal temperature of the reactor at the time of starting addition of the second alkali metal hydroxide solution is less than 65° C., a hydroxyalkyl alkyl cellulose having high thermal gel strength may not be produced. When the internal temperature of the reactor at the time of starting addition is more than 90° C., heat generation due to mercerization reaction of the alkali metal hydroxide and exothermic reactions due to alkylation and hydroxyalkylation may not be controlled. The internal temperature of the reactor at the time of completion of the addition of the second alkali metal hydroxide solution is preferably from 80° C. to 100° C., more preferably from 85 to 95° C. from the standpoint of obtaining a hydroxyalkyl alkyl cellulose having high thermal gel strength. The temperature at the time of starting addition of the second alkali metal hydroxide solution is preferably made lower than the temperature at the time of completing addition of the second alkali metal hydroxide solution, and the temperature difference therebetween is preferably from 3 to 20° C., more preferably from 4 to 15° C.

The addition rate of the second alkali metal hydroxide in the second alkali metal hydroxide solution is represented by the mole amount of the second alkali metal hydroxide added to the first reaction product mixture per hour per mole of the cellulose in cellulose pulp. It is preferably from 2.8 to 7.5 [mol/mol·hr], more preferably from 2.8 to 5.0 [mol/mol·hr], still more preferably from 2.8 to 4.0 [mol/mol·hr]. When the addition rate of the second alkali metal hydroxide is less than 2.8 [mol/mol·hr], the reaction time may be prolonged because of the long addition time of the second alkali metal hydroxide. Further, due to an excessive reduction in the thermal gelation temperature, the resulting alkyl cellulose may still remain gel-like at the temperature of food to be taken and may provide a solid texture. When the addition rate of the second alkali metal hydroxide is more than 7.5 [mol/mol·hr], a hydroxyalkyl alkyl cellulose having high thermal gel strength may not be obtained.

In the step of adding the second alkali metal hydroxide solution to the first reaction product mixture, it is preferable to increase the internal temperature of the reactor at a constant rate from the start to the completion of the addition of the second alkali metal hydroxide solution. The temperature increase rate is preferably from 10.0 to 40° C./hr, more preferably from 15.0 to 40° C./hr, still more preferably from 20.0 to 40° C./hr. When the temperature increase rate is less than 10.0° C./hr, the thermal gelation temperature of the produced alkyl cellulose may decrease so that the alkyl cellulose may remain gel-like at the temperature of food to be taken and provide a solid texture. When the temperature increasing rate is more than 40° C./hr, heat generation due to the mercerization reaction of the alkali metal hydroxide and heat generation due to etherification may not be controlled.

In general, the alkali cellulose obtained by mixing the cellulose pulp with the alkali metal hydroxide solution is reacted with an alkylating agent and a hydroxyalkylating agent for an etherification reaction to produce a hydroxyalkyl alkyl cellulose. Herein, the alkylating agent and hydroxyalkylating agent in the reaction system are consumed gradually as the etherification reaction progresses. When the internal temperature of the reactor is constant, the rate of the etherification reaction gradually decreases as the alkylating agent and the hydroxyalkylating agent are consumed in the reaction system. By adding the second alkali metal hydroxide solution while increasing the internal temperature of the reactor at a constant rate, the reduction in the rate of the etherification reaction due to the consumption of the alkylating agent and the hydroxyalkylating agent in the reaction system is suppressed, and the etherification reaction rate caused by the addition of the second alkali metal hydroxide solution is increased relatively. As a result, a hydroxyalkyl alkyl cellulose having high thermal gel strength can be obtained while suppressing a reduction in thermal gelation temperature.

After completion of the addition of the second alkali metal hydroxide solution, mixing with stirring is preferably continued to complete the etherification reaction.

The internal temperature of the reactor during the mixing with stirring after completion of the addition of the second alkali metal hydroxide solution is preferably from 80 to 120° C., more preferably from 85 to 100° C. from the standpoint of reaction control. After completion of the addition of the second alkali metal hydroxide solution, the resulting mixture is preferably heated to terminate the reaction.

The mixing time after completion of the addition of the second alkali metal hydroxide solution is preferably from 10 to 60 minutes, more preferably from 20 to 40 minutes, from the standpoint of productivity.

The second reaction product mixture thus obtained may be subjected to purification in the same manner as conventional purification of a crude hydroxyalkyl alkyl cellulose to obtain a hydroxyalkyl alkyl cellulose. For example, the purification comprises steps of: mixing the second reaction product mixture with water of from 60 to 100° C. in a stirring vessel to dissolve a salt generated as a by-product during the reaction, and subjecting a suspension discharged from the stirring vessel to a separation operation to remove the salt and obtain a desired purified hydroxyalkyl alkyl cellulose. For the separation operation, for example, a rotary pressure filter may be used. After the separation operation, the purified hydroxyalkyl alkyl cellulose is dried with a dryer. Examples of the dryer may include a conductive heat-transfer groove-type mixing dryer.

The hydroxyalkyl alkyl cellulose thus obtained may be optionally pulverized with a conventional pulverizer such as a ball mill, a roller mill or an impact grinder. The pulverized product may be classified by a sieve to control its particle size.

Examples of the hydroxyalkyl alkyl cellulose thus obtained include hydroxypropyl methyl cellulose, hydroxypropyl ethyl cellulose, hydroxyethyl methyl cellulose, and hydroxyethyl ethyl cellulose.

The hydroxyalkyl alkyl cellulose has a degree of substitution (DS) with alkoxy groups of preferably from 1.70 to 2.1, more preferably from 1.75 to 2.03, from the standpoint of obtaining a hydroxyalkyl alkyl cellulose having high gel strength and high productivity.

The hydroxyalkyl alkyl cellulose has a molar substitution (MS) with hydroxyalkoxy groups of preferably from 0.08 to 0.35, more preferably from 0.10 to 0.30, from the standpoint of achieving desired thermal gel strength and thermal gelation temperature.

In general, DS represents the degree of substitution and means an average number of hydroxyl groups which are replaced by methoxy or ethoxy groups per glucose ring unit of the cellulose, while MS represents the molar substitution and means an average mole number of hydroxyl groups which are replaced by hydroxyethoxy or hydroxypropoxy groups per glucose ring unit of the cellulose.

The degree of substitution with the alkoxy groups and the molar substitution with the hydroxyalkoxy groups with respect to the hydroxyalkyl alkyl cellulose may be determined by the Zeisel-GC method described in J. G. Gobler, E. P. Samsel, and G. H. Beaber, Talanta, 9, 474 (1962).

The viscosity at 20° C. of a 2% by weight aqueous solution of the hydroxyalkyl alkyl cellulose as measured with a Brookfield type viscometer is preferably from 400 to 100,000 mPa·s, more preferably from 1,000 to 50,000 mPa·s, still more preferably from 1,000 to 30,000 mPa·s from the standpoint of obtaining a hydroxyalkyl alkyl cellulose having high thermal gel strength.

The measurement of the viscosity using a Brookfield type viscometer may be carried out in accordance with the analytical method for hydroxypropyl methyl cellulose specified in the Japanese Pharmacopoeia 17th Edition.

The thermal gel strength of the hydroxyalkyl alkyl cellulose is expressed by a storage elastic modulus G'(80° C.) of a 2.0% by weight aqueous solution thereof at 80° C. In general, the storage elastic modulus represents an elastic factor of a solution, that is, a factor having characteristics that a substance deformed by application of a force is restored to its original shape after the force is released. The storage elastic modulus becomes an index of gel strength.

The storage elastic modulus G'(80° C.) at 80° C. of a 2.0% by weight aqueous solution of the hydroxyalkyl alkyl cellulose is preferably from 10 to 1,000 Pa, more preferably from 10 to 300 Pa, still more preferably from 10 to 100 Pa from the standpoint of high shape retention when added to food and lack of an excessively solid texture when the food is taken.

The storage elastic modulus G'(80° C.) of a 2.0% by weight aqueous solution of the hydroxyalkyl alkyl cellulose may be measured, for example, using MCR500, MCR501, or MCR502 which is a rheometer of Anton Paar.

The 2.0% by weight aqueous solution of the hydroxyalkyl alkyl cellulose is prepared in a method comprising steps of: placing an accurately weighed product corresponding to 6.00 g of the dried alkyl cellulose in a wide-mouthed bottle (i.e. a 350-ml volume bottle having a diameter of 65 mm and a height of 120 mm); adding hot water of 98° C. thereto to adjust a total amount to be 300.0 g; placing a lid on the bottle; stirring the resulting mixture with a stirrer at from 350 to 450 rpm for 20 minutes to obtain a uniform dispersion, and dissolving the dispersion with stirring in a water bath of 5° C. or less for 40 minutes to obtain the solution as a sample.

The temperature of a sample measurement section of the rheometer is controlled to 30° C. in advance, and the 2.0% by weight aqueous solution of the hydroxyalkyl alkyl cellulose thus obtained is poured up to a marked line (25 ml) of a CC27 measurement cup (i.e. a cylindrical vessel having a diameter of 30 mm and a height of 80 mm). Measurement is started by setting the frequency at 1 Hz and applying a distortion with amplitude of 0.5%. The sample measurement section is heated to 80° C. at a rate of 2° C./min. Data are collected at two points every minute.

The storage elastic modulus G' obtained by this measurement changes as the temperature of the measurement system increases, and the storage elastic modulus when the temperature of the measurement system reaches 80° C. is designated as the storage elastic modulus G'(80° C.) in the invention.

The thermal gelation temperature of the hydroxyalkyl alkyl cellulose is evaluated using the relationship between the storage elastic modulus G' and a loss elastic modulus G". In general, the term "loss elastic modulus" means a viscous factor of a solution, that is, a factor having characteristics that resistance is generated due to deformation of a fluid accompanying with the movement of the fluid. The loss elastic modulus becomes an index of the thermal gelation temperature.

The thermal gelation temperature of the 2.0% by weight aqueous solution of the hydroxyalkyl alkyl cellulose is preferably from 65 to 80° C., more preferably from 65 to 75° C. from the standpoint of not providing an excessively solid texture when it is taken.

The thermal gelation temperature of the 2.0% by weight aqueous solution of the hydroxyalkyl alkyl cellulose may be measured using, for example, MCR500, MCR501, or MCR502 which is a rheometer of Anton Paar.

The 2.0% by weight aqueous solution of the hydroxyalkyl alkyl cellulose is prepared in the same method as the method used for the preparation of the sample solution of the storage elastic modulus G'(80° C.).

The storage elastic modulus G'(30→80° C.) and loss elastic modulus G" are measured in the same manner as that for the measurement of the storage elastic modulus G'(80° C.). The temperature of a sample measurement section of the rheometer is controlled to 30° C. in advance; a 2.0% by weight aqueous solution of the hydroxyalkyl alkyl cellulose is poured up to a marked line (25 ml) of a CC27 measurement cup (i.e. a cylindrical vessel having a diameter of 30 mm and a height of 80 mm); and measurement is started by setting the frequency at 1 Hz and applying a distortion with amplitude of 0.5%. The sample measurement section is heated from 30° C. to 80° C. at a rate of 2° C./min. Data are collected at two points every minute.

The storage elastic modulus G'(30→80° C.) and loss elastic modulus G" determined by the above measurement change as the temperature of the measurement system increases. The temperature at which the loss elastic modulus G" becomes equal to the storage elastic modulus G', that is, the temperature at which the value of G"/G'(30→80° C.) becomes 1 is designated as a thermal gelation temperature.

EXAMPLES

The invention will hereinafter be described in detail with reference to Examples and Comparative Examples. It should not be construed that the invention is limited to or by Examples.

Example 1

A wood pulp having an intrinsic viscosity of 790 ml/g was pulverized with a pulverizer to obtain cellulose pulp powder. The cellulose pulp powder in an amount corresponding to 6.0 kg of cellulose was placed in an internal-stirring pressure-resistant reactor equipped with a jacket and oxygen in the reactor was removed sufficiently by vacuum and nitrogen purge.

A 49% weight aqueous sodium hydroxide solution was used as a first alkali metal hydroxide solution. The first aqueous sodium hydroxide solution was added to the cellulose pulp powder in the reactor with stirring at an addition rate of 14.8 [mol/mol·hr] in such an amount to make a mole ratio of the first sodium hydroxide to the cellulose (first sodium hydroxide/cellulose) to be 3.70, while adjusting the internal temperature of the reactor to 60° C., to obtain first alkali cellulose.

Next, 2.4 kg of dimethyl ether was added and the internal temperature of the reactor was controlled to 60° C. After the addition of dimethyl ether, methyl chloride was added to the reactor over 60 minutes, while increasing the internal temperature of the reactor from 60° C. to 80° C., in such an amount that a mole ratio of methyl chloride to the total amount of the first sodium hydroxide added and the second sodium hydroxide to be added (methyl chloride/sodium hydroxides in total) of 1.1. At the same time as the start of the addition of methyl chloride, 2.93 kg of propylene oxide (i.e. at a mole ratio of propylene oxide to the cellulose of 1:36) was added over 10 minutes. Thus, a first reaction product mixture was obtained. A 49% by weight aqueous sodium hydroxide solution was used as a second alkali metal hydroxide solution. Subsequent to the completion of the addition of methyl chloride, the second aqueous sodium hydroxide solution was added at an addition rate of 2.88 [mol/mol·hr] in such an amount to make a mole ratio of the second sodium hydroxide to the cellulose (second sodium hydroxide/cellulose) to be 1.20 to obtain a second reaction product mixture. The internal temperature of the reactor was 80.0° C. at the start of the addition of the second aqueous sodium hydroxide solution, and was increased at 21.60° C./hr from the start to completion of the addition of the second aqueous sodium hydroxide solution. The internal temperature of the reactor was 89° C. at the completion of the addition of the second aqueous sodium hydroxide solution. After the completion of the addition of the second aqueous sodium hydroxide solution, stirring was continued for 30 minutes to complete the etherification reaction. The weight ratio of the first sodium hydroxide to the total of the first and second sodium hydroxides was 75.5%.

The second reaction product mixture thus obtained was made into a slurry by the addition of hot water of 95° C. The slurry was washed using a rotary pressure filter, dried with an air drier, pulverized in an impact grinder or victory mill, and classified through a sieve to obtain hydroxypropyl methyl cellulose. The experimental conditions are shown in Table 1.

The hydroxypropyl methyl cellulose thus obtained had DS of 1.90, MS of 0.259, and a viscosity at 20° C. of a 2% by weight aqueous solution of 5,900 mPa·s as measured with a Brookfield type viscometer. As a result of measurement with MCR502 which is a rheometer of Anton Paar (in the same manner as in the other Examples and Comparative Examples), the storage elastic modulus G'(80° C.) at 80° C. of a 2% by weight aqueous solution of hydroxypropyl methyl cellulose was 24.0 Pa and the thermal gelation temperature was 66.5° C. The results thus obtained are shown in Table 1.

Example 2

The cellulose pulp was placed in the reactor in the same manner as in Example 1. A 49% by weight aqueous sodium hydroxide solution was used as a first alkali metal hydroxide solution. The first aqueous sodium hydroxide solution was added to the cellulose pulp in the reactor with stirring at an addition rate of 16.0 [mol/mol·hr] in such amount to make a mole ratio of the first sodium hydroxide to the cellulose (first sodium hydroxide/cellulose) to be 4.00, while adjusting the internal temperature of the reactor to 55° C., to obtain first alkali cellulose.

Next, a first reaction product mixture was obtained in the same manner as in Example 1 except that the amount of propylene oxide added was 3.10 kg (i.e. a mole ratio of propylene oxide to cellulose of 1.44). A second reaction product mixture was obtained in the same manner as in Example 1 except that the internal temperature of the reactor was 79.0° C. at the time of the start of the addition of a second aqueous sodium hydroxide solution, and was increased at 27.00° C./hr from the start to the completion of the addition of the second aqueous sodium hydroxide solution, and the second aqueous sodium hydroxide solution was added at an addition rate of 3.00 [mol/mol·hr] in such an amount to make a mole ratio of the second sodium hydroxide to the cellulose (second sodium hydroxide/cellulose) to be 1.00. The internal temperature of the reactor was 88.0° C. at the completion of the addition of the second aqueous sodium hydroxide solution. The weight ratio of the first sodium hydroxide to the total of the first and second sodium hydroxides was 80.0%.

Then, the second reaction product mixture thus obtained was subjected to purification and pulverized in the same manner as in Example 1 to obtain hydroxypropyl methyl cellulose. Experimental conditions are shown in Table 1.

The hydroxypropyl methyl cellulose thus obtained had DS of 1.89, MS of 0.259 and a viscosity at 20° C. of a 2% by weight aqueous solution of 5,850 mPa·s as measured with a Brookfield type viscometer. As a result of measurement, the storage elastic modulus G'(80° C.) at 80° C. of a 2% by weight aqueous solution of hydroxypropyl methyl cellulose was 22.0 Pa and the thermal gelation temperature was 66.0° C. The results thus obtained are shown in Table 1.

Example 3

The cellulose pulp was placed in the reactor in the same manner as in Example 1. A 49% by weight aqueous sodium hydroxide solution was used as a first alkali metal hydroxide solution. The first aqueous sodium hydroxide solution was added to the cellulose pulp in the reactor with stirring at an addition rate of 18.0 [mol/mol·hr] in such an amount to make a mole ratio of the first sodium hydroxide to the cellulose (first sodium hydroxide/cellulose) to be 4.50, while adjusting the internal temperature of the reactor to 55° C., to obtain a first alkali cellulose.

Next, a first reaction product mixture was obtained in the same manner as in Example 1 except that the amount of propylene oxide added was 3.08 kg (i.e. a mole ratio of propylene oxide to cellulose of 1.43). A second reaction product mixture was obtained in the same manner as in Example 1 except that the internal temperature of the reactor was 81.5° C. at the time of the start of the addition of a second aqueous sodium hydroxide solution, and was increased at 33.00° C./hr from the start to the completion of the addition of the second aqueous sodium hydroxide solution, and the second aqueous sodium hydroxide solution was added at an addition rate of 3.30 [mol/mol·hr] in such an amount to make a mole ratio of the second sodium hydroxide to the cellulose (second sodium hydroxide/cellulose) to be 0.55. The internal temperature of the reactor was 87.0° C. at the completion of the addition of the second aqueous sodium hydroxide solution. The weight ratio of the first sodium hydroxide to the total of the first and second sodium hydroxides was 89.1%.

Then, the second reaction product mixture thus obtained was subjected to purification and pulverized in the same manner as in Example 1 to obtain hydroxypropyl methyl cellulose. Experimental conditions are shown in Table 1.

The hydroxypropyl methyl cellulose thus obtained had DS of 1.89, MS of 0.265, and a viscosity at 20° C. of a 2% by weight aqueous solution of 5,125 mPa·s as measured with a Brookfield type viscometer. As a result of measurement, the storage elastic modulus G'(80° C.) at 80° C. of a 2% by weight aqueous solution of hydroxypropyl methyl cellulose was 14.0 Pa and the thermal gelation temperature was 67.0° C. The results thus obtained are shown in Table 1.

Example 4

The cellulose pulp was placed in the reactor in the same manner as in Example 1. A 49% by weight aqueous sodium hydroxide solution was used as a first alkali metal hydroxide solution. The first aqueous sodium hydroxide solution was added to the cellulose pulp in the rector with stirring at an addition rate of 18.0 [mol/mol·hr] in such an amount to make a mole ratio of the first sodium hydroxide to the cellulose (first sodium hydroxide/cellulose) to be 4.50, while adjusting the internal temperature of the reactor to 55° C., to obtain first alkali cellulose.

Next, a first reaction product mixture was obtained in the same manner as in Example 1 except that the amount of propylene oxide added was 3.22 kg (i.e. a mole ratio of propylene oxide to cellulose of 1.50). A second reaction product mixture was obtained in the same manner as in Example 1 except that the internal temperature of the reactor was 79.0° C. at the time of the start of the addition of a second aqueous sodium hydroxide solution, and was increased at 24.00° C./hr from the start to the completion of the addition of the second aqueous sodium hydroxide solution, and the second aqueous sodium hydroxide solution was added at an addition rate of 3.60 [mol/mol·hr] in such an amount to make a mole ratio of the second sodium hydroxide to the cellulose (second sodium hydroxide/cellulose) to be 1.20. The internal temperature of the reactor was 87.0° C. at the completion of the addition of the second aqueous sodium hydroxide solution. The weight ratio of the first sodium hydroxide to the total of the first and second sodium hydroxides was 78.9%.

Then, the second reaction product mixture thus obtained was subjected to purification and pulverized in the same manner as in Example 1 to obtain hydroxypropyl methyl cellulose. Experimental conditions are shown in Table 1.

The hydroxypropyl methyl cellulose thus obtained had DS of 1.98, MS of 0.254, and a viscosity at 20° C. of a 2% by weight aqueous solution of 5,900 mPa·s as measured with a Brookfield type viscometer. As a result of measurement, the storage elastic modulus G'(80° C.) at 80° C. of a 2% by weight aqueous solution of hydroxypropyl methyl cellulose was 35.0 Pa and the thermal gelation temperature was 66.5° C. The results thus obtained are shown in Table 1.

Example 5

The cellulose pulp was placed in the reactor in the same manner as in Example 1. A 49% by weight aqueous sodium hydroxide solution was used as a first alkali metal hydroxide solution. The first aqueous sodium hydroxide solution was added to the cellulose pulp in the reactor with stirring at an addition rate of 14.8 [mol/mol·hr] in such an amount to make a mole ratio of the first sodium hydroxide to the cellulose (first sodium hydroxide/cellulose) to be 3.70, while adjusting the internal temperature of the reactor to 55° C., to obtain first alkali cellulose.

Next, a first reaction product mixture was obtained in the same manner as in Example 1 except that the amount of propylene oxide added was 1.90 kg (i.e. a mole ratio of propylene oxide to cellulose: 0.88). A second reaction product mixture was obtained in the same manner as in Example 1 except the internal temperature of the reactor was 82.0° C. at the time of the start of the addition of a second aqueous sodium hydroxide solution, and was increased at 30.00° C./hr from the start to the completion of the addition of the second aqueous sodium hydroxide solution, and the second aqueous sodium hydroxide solution was added at an addition rate of 3.00 [mol/mol·hr] in such an amount to make a mole ratio of the second sodium hydroxide to the cellulose (second sodium hydroxide/cellulose) to be 0.50. The internal temperature of the reactor was 87.0° C. at the completion of the addition of the second aqueous sodium hydroxide solution. The weight ratio of the first sodium hydroxide to the total of the first and second sodium hydroxides was 88.1%.

Then, the second reaction product mixture thus obtained was subjected to purification and pulverized in the same manner as in Example 1 to obtain hydroxypropyl methyl cellulose. Experimental conditions are shown in Table 1.

The hydroxypropyl methyl cellulose thus obtained had DS of 1.84, MS of 0.230, and a viscosity at 20° C. of a 2% by weight aqueous solution of 5,800 mPa·s as measured with a Brookfield type viscometer. As a result of measurement, the storage elastic modulus G'(80° C.) at 80° C. of a 2% by weight aqueous solution of hydroxypropyl methyl cellulose was 17.0 Pa and the thermal gelation temperature was 67.0° C. The results thus obtained are shown in Table 1.

Example 6

The cellulose pulp was placed in the reactor in the same manner as in Example 1. A 49% by weight aqueous sodium hydroxide solution was used as a first alkali metal hydroxide solution. The first aqueous sodium hydroxide solution was added to the cellulose pulp in the reactor with stirring at an addition rate of 14.8 [mol/mol·hr] in such an amount to make a mole ratio of the first sodium hydroxide to the cellulose (first sodium hydroxide/cellulose) to be 3.70, while adjusting the internal temperature of the reactor to 55° C., to obtain first alkali cellulose.

Next, a first reaction product mixture was obtained in the same manner as in Example 1 except that the amount of propylene oxide added was 1.59 kg (i.e. a mole ratio of propylene oxide to cellulose of 0.74). A second reaction product mixture was obtained in the same manner as in Example 1 except that the internal temperature of the reactor was 81.0° C. at the time of the start of the addition of a second aqueous sodium hydroxide solution, and was increased at 20.00° C./hr from the start to the completion of the addition of the second aqueous sodium hydroxide solution, and the second aqueous sodium hydroxide solution was added at an addition rate of 3.00 [mol/mol·hr] in such an amount to make a mole ratio of the second sodium hydroxide to the cellulose (second sodium hydroxide/cellulose) to be 0.75. The internal temperature of the reactor was 86.0° C. at the completion of the addition of the second aqueous sodium hydroxide solution. The weight ratio of the first sodium hydroxide to the total of the first and second sodium hydroxides was 83.1%.

Then, the second reaction product mixture thus obtained was subjected to purification and pulverized in the same manner as in Example 1 to obtain hydroxypropyl methyl cellulose. Experimental conditions are shown in Table 1.

The hydroxypropyl methyl cellulose thus obtained had DS of 1.86, MS of 0.170, and a viscosity at 20° C. of a 2% by weight aqueous solution of 5,350 mPa·s as measured with a Brookfield type viscometer. As a result of measurement, the storage elastic modulus G'(80° C.) at 80° C. of a 2% by weight aqueous solution of hydroxypropyl methyl cellulose was 45.0 Pa and the thermal gelation temperature was 66.5° C. The results thus obtained are shown in Table 1.

Example 7

The cellulose pulp was placed in the reactor in the same manner as in Example 1. A 49% by weight aqueous sodium hydroxide solution was used as a first alkali metal hydroxide solution. The first aqueous sodium hydroxide solution was added to the cellulose pulp in the reactor with stirring at an addition rate of 14.96 [mol/mol·hr] in such an amount to make a mole ratio of the first sodium hydroxide to the cellulose (first sodium hydroxide/cellulose) to be 3.74, while adjusting the internal temperature of the reactor to 55° C., to obtain first alkali cellulose.

Next, a first reaction product mixture was obtained in the same manner as in Example 1 except that the amount of propylene oxide added was 1.12 kg (i.e. a mole ratio of propylene oxide to cellulose: 0.52). A second reaction product mixture was obtained in the same manner as in Example 1 except the internal temperature of the reactor was 81.0° C. at the time of the start of the addition of a second aqueous sodium hydroxide solution, and was increased at 38.18° C./hr from the start to the completion of the addition of the second aqueous sodium hydroxide solution, and the second aqueous sodium hydroxide solution was added at an addition rate of 3.60 [mol/mol·hr] in such an amount to make a mole ratio of the second sodium hydroxide to the cellulose (second sodium hydroxide/cellulose) to be 0.66. The internal temperature of the reactor was 88.0° C. at the completion of the addition of the second aqueous sodium hydroxide solution. The weight ratio of the first sodium hydroxide to the total of the first and second sodium hydroxides was 85.0%.

Then, the second reaction product mixture thus obtained was subjected to purification and pulverized in the same manner as in Example 1 to obtain hydroxypropyl methyl cellulose. Experimental conditions are shown in Table 1.

The hydroxypropyl methyl cellulose thus obtained had DS of 1.84, MS of 0.125, and a viscosity at 20° C. of a 2% by weight aqueous solution of 5,300 mPa·s as measured with a Brookfield type viscometer. As a result of measurement, the storage elastic modulus G'(80° C.) at 80° C. of a 2% by weight aqueous solution of hydroxypropyl methyl cellulose was 73.7 Pa and the thermal gelation temperature was 66.0° C. The results thus obtained are shown in Table 1.

Comparative Example 1

The cellulose pulp was placed in the reactor in the same manner as in Example 1. A 49% by weight aqueous sodium hydroxide solution was added in one step, not in two steps, to the cellulose pulp in the reactor with stirring at an addition rate of 20.0 [mol/mol·hr] in such an amount to make a mole ratio of the sodium hydroxide to the cellulose (sodium hydroxide/cellulose) to be 5.00, while adjusting the internal temperature of the reactor to 60° C., to obtain an alkali cellulose.

Next, 2.4 kg of dimethyl ether was added thereto and the temperature was controlled to keep the internal temperature of the reactor at 60° C. Then, methyl chloride was added over 60 minutes in such an amount to make a mole ratio of methyl chloride to sodium hydroxide (methyl chloride/ sodium hydroxide) to be 1.1, while increasing the internal temperature of the reactor from 60 to 80° C. At the same time as the start of the addition of methyl chloride, 2.99 kg of propylene oxide (i.e. a mole ratio of propylene oxide to cellulose of 1.39) was added over 10 minutes. Thus, a first reaction product mixture was obtained. Subsequent to the completion of the addition of methyl chloride, an etherification reaction was carried out for 70 minutes while increasing the internal temperature of the reactor from 80° C. to 95° C. to obtain crude hydroxypropyl methyl cellulose.

Then, the crude hydroxypropyl methyl cellulose thus obtained was subjected to purification and pulverized in the same manner as in Example 1 to obtain hydroxypropyl methyl cellulose. Experimental conditions are shown in Table 1.

The hydroxypropyl methyl cellulose thus obtained had DS of 1.86, MS of 0.250, and a viscosity at 20° C. of a 2% by weight aqueous solution of 5,700 mPa·s as measured with a Brookfield type viscometer. As a result of measurement, the storage elastic modulus G'(80° C.) at 80° C. of a 2% by weight aqueous solution of hydroxypropyl methyl cellulose was 1.5 Pa and the thermal gelation temperature was 67.5° C. The results thus obtained are shown in Table 1.

Comparative Example 2

The cellulose pulp was placed in the reactor in the same manner as in Example 1. A 49% by weight aqueous sodium hydroxide solution was used as a first alkali metal hydroxide solution. The first aqueous sodium hydroxide solution was added to the cellulose pulp in the reactor with stirring at an addition rate of 14.0 [mol/mol·hr] in such an amount to make a mole ratio of the first sodium hydroxide to the cellulose (first sodium hydroxide/cellulose) to be 3.50, while adjusting the internal temperature of the reactor to 55° C., to obtain first alkali cellulose.

Next, a first reaction product mixture was obtained in the same manner as in Example 1 except that the amount of propylene oxide added was 3.02 kg (i.e. a mole ratio of propylene oxide to cellulose of 1.40). A second reaction product mixture was obtained in the same manner as in Example 1 except the internal temperature of the reactor was 81.0° C. at the time of the start of the addition of a second aqueous sodium hydroxide solution, and kept at 81.0° C. from the start to the completion of the addition of the second sodium hydroxide solution, and the second aqueous sodium hydroxide solution was added at an addition rate of 3.60 [mol/mol·hr] in such an amount to make a mole ratio of the second sodium hydroxide to the cellulose (second sodium hydroxide/cellulose) to be 1.50. The internal temperature of the reactor was 89.0° C. at the completion of the addition of the second aqueous sodium hydroxide solution. The weight ratio of the first sodium hydroxide to the total of the first and second sodium hydroxides was 70.0%.

Then, the second reaction product mixture thus obtained was subjected to purification and pulverized in the same manner as in Example 1 to obtain hydroxypropyl methyl cellulose. Experimental conditions are shown in Table 1.

The hydroxypropyl methyl cellulose thus obtained had DS of 1.93, MS of 0.260, and a viscosity at 20° C. of a 2% by weight aqueous solution of 5,900 mPa·s as measured with a Brookfield type viscometer. As a result of measurement, the storage elastic modulus G'(80° C.) at 80° C. of a 2% by weight aqueous solution of hydroxypropyl methyl cellulose was 40.0 Pa and the thermal gelation temperature was 61.5° C. The results thus obtained are shown in Table 1.

Comparative Example 3

The cellulose pulp was placed in the reactor in the same manner as in Example 1. A 49% by weight aqueous sodium hydroxide solution was used as a first alkali metal hydroxide solution. The first aqueous sodium hydroxide solution was added to the cellulose pulp in the reactor with stirring at an addition rate of 12.0 [mol/mol·hr] in such an amount to make a mole ratio of the first sodium hydroxide to the cellulose (first sodium hydroxide/cellulose) to be 3.00, while adjusting the internal temperature of the reactor to 55° C., to obtain first alkali cellulose.

Next, a first reaction product mixture was obtained in the same manner as in Example 1 except that the amount of propylene oxide added was 1.72 kg (i.e. a mole ratio of propylene oxide to cellulose of 0.80).

A 49% by weight aqueous sodium hydroxide solution was used as a second alkali metal hydroxide solution. After completion of the addition of methyl chloride, the internal temperature of the reactor was 80.0° C. at the start of the addition of the 49% by weight aqueous sodium hydroxide solution, and kept at 80.0° C. during the addition at an addition rate of 1.00 [mol/mol·hr] in such an amount to make a mole ratio of the second sodium hydroxide to the cellulose (second sodium hydroxide/cellulose) to be 1.00. Thus, a second reaction product mixture was obtained. The weight ratio of the first sodium hydroxide to the total of the first and second sodium hydroxides was 75.0%.

The hydroxypropyl methyl cellulose thus obtained had DS of 1.86, MS of 0.200, and a viscosity at 20° C. of a 2% by weight aqueous solution of 6,050 mPa·s as measured with a Brookfield type viscometer. As a result of measurement, the storage elastic modulus G'(80° C.) at 80° C. of a 2% by weight aqueous solution of hydroxypropyl methyl cellulose was 30.0 Pa and the thermal gelation temperature was 61.0° C. The results thus obtained are shown in Table 1.

Comparative Example 4

The cellulose pulp was placed in the reactor in the same manner as in Example 1. A 49% by weight aqueous sodium hydroxide solution was used as a first alkali metal hydroxide solution. The first aqueous sodium hydroxide solution was added to the cellulose pulp in the reactor with stirring at an addition rate of 3.6 [mol/mol·hr] in such an amount to make a mole ratio of the first sodium hydroxide to the cellulose (first sodium hydroxide/cellulose) to be 0.90, while adjusting the internal temperature of the reactor to 55° C., to obtain first alkali cellulose.

Next, a first reaction product mixture was obtained in the same manner as in Example 1 except that the amount of propylene oxide added was 2.43 kg (i.e. a mole ratio of propylene oxide to cellulose of 1.13). A second reaction product mixture was obtained in the same manner as in Example 1 except that the internal temperature of the reactor was 81.0° C. at the starting of the addition of a second aqueous sodium hydroxide solution, the second aqueous sodium hydroxide solution was added at an addition rate of 6.80 [mol/mol·hr] in such an amount to make a mole ratio of the second sodium hydroxide to the cellulose (second sodium hydroxide/cellulose) to be 3.40, and the internal temperature of the reactor was 89.0° C. at the completion of the addition of the second aqueous sodium hydroxide solution. The weight ratio of the first sodium hydroxide to the total of the first and second sodium hydroxides was 20.9%.

Then, the second reaction product mixture thus obtained was subjected to purification and pulverized in the same manner as in Example 1 to obtain hydroxypropyl methyl cellulose. Experimental conditions are shown in Table 1.

The hydroxypropyl methyl cellulose thus obtained had DS of 1.80, MS of 0.260, and a viscosity at 20° C. of a 2% by weight aqueous solution of 5,700 mPa·s as measured with a Brookfield type viscometer. As a result of measurement, the storage elastic modulus G'(80° C.) at 80° C. of a 2% by weight aqueous solution of hydroxypropyl methyl cellulose was 750.0 Pa and the thermal gelation temperature was 44.0° C. The results thus obtained are shown in Table 1.

Comparative Example 5

The cellulose pulp was placed in the reactor in the same manner as in Example 1. A 49% by weight aqueous sodium hydroxide solution was used as a first alkali metal hydroxide solution. While adjusting the internal temperature of the reactor to 30° C., the first aqueous sodium hydroxide solution was added to the cellulose pulp in the reactor with stirring at an addition rate of 15.2 [mol/mol·hr] in such an amount to make a mole ratio of the first sodium hydroxide to the cellulose (first sodium hydroxide/cellulose) to be 3.80, and after completion of the addition, stirring was continued for further 10 minutes.

Next, 4.8 kg of diethyl ether was added thereto and the temperature was controlled to keep the internal temperature of the reactor at 40° C. Methyl chloride was added in two steps similarly to the two-step addition of the sodium hydroxide solution, while propylene oxide was added in one step. After addition of dimethyl ether, the first methyl chloride was added over 20 minutes in such an amount to make a mole ratio of the first methyl chloride to the first sodium hydrochloride (first methyl chloride/first sodium chloride) to be 1.1. At the same time as the start of the addition of the first methyl chloride, 1.92 kg of propylene oxide (i.e. a mole ratio of propylene oxide to cellulose of 0.89) was added over 5 minutes to obtain a first reaction product mixture. After completion of the addition of the first methyl chloride, the internal temperature of the reactor was controlled from 40° C. to 90° C. over 40 minutes and after it reached 90° C., mixing with stirring was continued for further 60 minutes.

Then, the internal temperature of the reactor was cooled to 50° C. over 15 minutes. A 49% by weight aqueous sodium hydroxide solution was used as a second alkali metal hydroxide solution. The internal temperature of the reactor at the time of the start of the addition of the second aqueous sodium hydroxide solution was 50.0° C., and the 49% by weight aqueous sodium hydroxide solution was added at an addition rate of 5.70 [mol/mol·hr] in such an amount to make a mole ratio of the second sodium hydroxide to the cellulose (second sodium hydroxide/cellulose) to be 1.90 to obtain a second reaction product mixture. The internal temperature of the reactor at the completion of the addition of the second aqueous sodium hydroxide solution was 55° C. The weight ratio of the first sodium hydroxide to the total of the first and second sodium hydroxides was 66.7%.

Subsequent to the addition of the second sodium hydroxide, the second methyl chloride was added over 20 minutes in such an amount to make a mole ratio of the second methyl chloride to the second sodium hydroxide (second methyl chloride/second sodium hydroxide) to be 1.1. After the addition of the second methyl chloride, the internal temperature of the reactor was increased to 90° C. over 40 minutes, and then kept at 90° C. for further 30 minutes with stirring for mixing to obtain crude hydroxypropyl methyl cellulose.

The crude hydroxypropyl methyl cellulose thus obtained was purified and pulverized in the same manner as in Example 1 to obtain hydroxypropyl methyl cellulose. Experimental conditions are shown in Table 1.

The hydroxypropyl methyl cellulose thus obtained had DS of 1.97, MS of 0.250, and a viscosity at 20° C. of a 2% by weight aqueous solution of 5,900 mPa·s as measured with a Brookfield type viscometer. As a result of measurement, the storage elastic modulus G'(80° C.) at 80° C. of a 2% by weight aqueous solution of hydroxypropyl methyl cellulose was 18.0 Pa and the thermal gelation temperature was 62.0° C. The results thus obtained are shown in Table 1.

Comparative Example 6

A wood pulp having an intrinsic viscosity of 790 ml/g was pulverized with a pulverizer to obtain cellulose pulp powder. The cellulose pulp powder in an amount corresponding to 6.0 kg of cellulose was placed in an internal-stirring pressure-resistant reactor equipped with a jacket, and oxygen in the reactor was removed sufficiently by vacuum and nitrogen purge.

Next, the contents in the reactor were stirred while controlling the internal temperature of the reactor to 40° C. A 49% by weight aqueous sodium hydroxide solution was used as a first alkali metal hydroxide solution. The first aqueous sodium hydroxide solution was added to the cellulose pulp powder in the reactor with stirring at an addition rate of 8.0 [mol/mol·hr] in such an amount to make a mole ratio of the first sodium hydroxide to the cellulose (first sodium hydroxide/cellulose) to be 2.00. The resulting mixture was then mixed with stirring for 20 minutes to obtain first alkali cellulose.

Next, 4.8 kg of dimethyl ether was added and the internal temperature of the reactor was controlled at 40° C. Methyl chloride was added in two steps similarly to the two-step addition of sodium hydroxide solution, while propylene oxide was added in one step. After addition of dimethyl ether, the first methyl chloride was added over 5 minutes in such an amount to make a mole ratio of the first methyl chloride to the first sodium hydrochloride (methyl chloride/first sodium hydroxide) to be 1.25. At the same time as the start of the addition of the methyl chloride, 2.93 kg of propylene oxide (i.e. a mole ratio of propylene oxide to cellulose of 1.36) was added over 5 minutes. Thus, a first reaction product mixture was obtained. After completion of the addition of the methyl chloride and propylene oxide, the internal temperature of the reactor was increased from 40° C. to 80° C. over 60 minutes and then kept at 80° C. for 30 minutes.

The second methyl chloride was added over 10 minutes in such an amount to make a mole ratio of the second methyl chloride to the second sodium hydroxide (second methyl chloride/second sodium hydroxide) to be 1.22, while continuously keeping the internal temperature at 80° C. A 49% by weight aqueous sodium hydroxide solution was used as the second alkali metal hydroxide solution. After the completion of the addition of the second methyl chloride, the internal temperature of the reactor was 80.0° C. at the start of the addition of the second aqueous sodium hydroxide solution, and was kept at 80° C. during the addition of the second aqueous sodium hydroxide solution at an addition rate of 1.53 [mol/mol·hr] in such an amount to make a mole ratio of the second sodium hydroxide to the cellulose (second sodium hydroxide/cellulose) to be 2.30. Thus, a second reaction product mixture was obtained. After completion of the charge of the second aqueous sodium hydroxide solution, stirring was continued for 120 minutes while keeping the internal temperature of the reactor at 80° C. to complete an etherification reaction. The weight ratio of the first sodium hydroxide to the total of the first and second sodium hydroxides was 46.5%.

The second reaction product mixture thus obtained was made into a slurry by the addition of hot water of 95° C. The slurry was washed using a rotary pressure filter, dried with an air drier, pulverized in an impact grinder or victory mill, and classified through a sieve to obtain hydroxypropyl methyl cellulose. The experimental conditions are shown in Table 1.

The hydroxypropyl methyl cellulose thus obtained had DS of 1.84, MS of 0.270, and a viscosity at 20° C. of a 2% by weight aqueous solution of 6,150 mPa·s as measured with a Brookfield type viscometer. As a result of measurement, the storage elastic modulus G'(80° C.) at 80° C. of a 2% by weight aqueous solution of hydroxypropyl methyl cellulose was 550.0 Pa and the thermal gelation temperature was 56.0° C. The results thus obtained are shown in Table 1.

TABLE 1

| | | | production conditions | | | | | | |
|---|---|---|---|---|---|---|---|---|---|
| | | | first NaOH | | | second NaOH | | | |
| | intrinsic viscosity of pulp (ml/g) | addition of methyl chloride | mole ratio of propylene oxide to cellulose | weight ratio of first NaOH to total of first and second NaOH (%) | mole ratio of first NaOH to cellulose | addition rate of first NaOH relative to cellulose (mol/mol · hr) | mole ratio of second NaOH to cellulose | addition rate of second NaOH relative to cellulose (mol/mol · hr) | internal temperature of reactor at start of addition of second NaOH (° C.) | temperature increase rate (° C./hr) |
| Example1 | 790 | 1 step | 1.36 | 75.5 | 3.70 | 14.8 | 1.20 | 2.88 | 80.0 | 21.60 |
| Example2 | 790 | 1 step | 1.44 | 80.0 | 4.00 | 16.0 | 1.00 | 3.00 | 79.0 | 27.00 |
| Exampl3 | 790 | 1 step | 1.43 | 89.1 | 4.50 | 18.0 | 0.55 | 3.30 | 81.5 | 33.00 |
| Example4 | 790 | 1 step | 1.50 | 78.9 | 4.50 | 18.0 | 1.20 | 3.60 | 79.0 | 24.00 |
| Example5 | 790 | 1 step | 0.88 | 88.1 | 3.70 | 14.8 | 0.50 | 3.00 | 82.0 | 30.00 |
| Example6 | 790 | 1 step | 0.74 | 83.1 | 3.70 | 14.8 | 0.75 | 3.00 | 81.0 | 20.00 |
| Example7 | 790 | 1 step | 0.52 | 85.0 | 3.74 | 14.96 | 0.66 | 3.60 | 81.0 | 38.18 |
| Comp. Ex. 1 | 790 | 1 step | 1.39 | 100.0 | 5.00 | 20.0 | — | — | — | — |
| Comp. Ex. 2 | 790 | 1 step | 1.40 | 70.0 | 3.50 | 14.0 | 1.50 | 3.60 | 81.0 | — |
| Comp. Ex. 3 | 790 | 1 step | 0.80 | 75.0 | 3.00 | 12.0 | 1.00 | 1.00 | 80.0 | — |

TABLE 1-continued

| | | | production conditions | | | | | | |
|---|---|---|---|---|---|---|---|---|---|
| | | | | first NaOH | | | second NaOH | | |
| | intrinsic viscosity of pulp (ml/g) | addition of methyl chloride | mole ratio of propylene oxide to cellulose | weight ratio of first NaOH to total of first and second NaOH (%) | mole ratio of first NaOH to cellulose | addition rate of first NaOH relative to cellulose (mol/mol · hr) | mole ratio of second NaOH to cellulose | addition rate of second NaOH relative to cellulose (mol/mol · hr) | internal temperature of reactor at start of addition of second NaOH (° C.) | temperature increase rate (° C./hr) |
| Comp. Ex. 4 | 790 | 1 step | 1.13 | 20.9 | 0.90 | 3.6 | 3.40 | 6.80 | 81.0 | — |
| Comp. Ex. 5 | 790 | 2 steps | 0.89 | 66.7 | 3.80 | 15.2 | 1.90 | 5.70 | 50.0 | — |
| Comp. Ex. 6 | 790 | 2 steps | 1.36 | 46.5 | 2.00 | 8.0 | 2.30 | 1.53 | 80.0 | — |

TABLE 2

| | properties | | | | |
|---|---|---|---|---|---|
| | methoxy degree of substitution (DS) | hydroxy-propoxy molar substitution (MS) | viscosity at 20° C. of aq. 2 wt. solution with Brookfield viscometer (mPa · s) | storage elastic modulus at 80° C. of aq. 2 wt. solution (Pa) | thermal gelation temperature of aq. 2 wt. solution (° C.) |
| Example 1 | 1.90 | 0.259 | 5900 | 24.0 | 66.5 |
| Example 2 | 1.89 | 0.259 | 5850 | 22.0 | 66.0 |
| Exampl 3 | 1.89 | 0.265 | 5125 | 14.0 | 67.0 |
| Example 4 | 1.98 | 0.254 | 5900 | 35.0 | 66.5 |
| Example 5 | 1.84 | 0.230 | 5800 | 17.0 | 67.0 |
| Example 6 | 1.86 | 0.170 | 5350 | 45.0 | 66.5 |
| Example 7 | 1.84 | 0.125 | 5300 | 73.7 | 66.0 |
| Comp. Ex. 1 | 1.86 | 0.250 | 5700 | 1.5 | 67.5 |
| Comp. Ex. 2 | 1.93 | 0.260 | 5900 | 40.0 | 60.5 |
| Comp. Ex. 3 | 1.86 | 0.200 | 6050 | 30.0 | 61.0 |
| Comp. Ex. 4 | 1.80 | 0.260 | 5700 | 750.0 | 44.0 |
| Comp. Ex. 5 | 1.97 | 0.250 | 5900 | 18.0 | 62.5 |
| Comp. Ex. 6 | 1.84 | 0.270 | 6150 | 550.0 | 56.0 |

The invention claimed is:

1. A method for producing a hydroxyalkyl alkyl cellulose, comprising steps of:
   mixing cellulose pulp with a first alkali metal hydroxide solution to obtain alkali cellulose,
   reacting the alkali cellulose with an alkylating agent and a hydroxyalkylating agent to obtain a first reaction product mixture,
   adding a second alkali metal hydroxide solution to the first reaction product mixture without further adding any of alkylating and hydroxyalkylating agents to obtain a second reaction product mixture, and
   subjecting the second product reaction product mixture to purification to obtain a hydroxyalkyl alkyl cellulose, wherein
   a mole ratio of a first alkali metal hydroxide in the first alkali metal hydroxide solution to cellulose in the cellulose pulp (first alkali metal hydroxide/cellulose) is from 3.7 to 4.7, and
   a ratio of weight of the first alkali metal hydroxide to total weight of the first alkali metal hydroxide and a second alkali metal hydroxide in the first and second alkali metal hydroxide solutions is from 0.75 to 0.93.

2. The method for producing a hydroxyalkyl alkyl cellulose according to claim 1, wherein the step of adding the second alkali metal hydroxide solution to the first reaction product mixture is carried out in a reactor, while increasing an internal temperature of the reactor at a constant rate throughout the addition.

3. The method for producing a hydroxyalkyl alkyl cellulose according to claim 2, wherein the constant rate of increasing the temperature is from 10.0 to 40° C./hr.

4. The method for producing a hydroxyalkyl alkyl cellulose according to claim 1, wherein the step of adding the second alkali metal hydroxide solution to the first reaction product mixture is carried out in a reactor, and the internal temperature of the reactor at the time of start of the addition is from 65 to 90° C.

5. The method for producing a hydroxyalkyl alkyl cellulose according to claim 1, wherein an addition rate of the second alkali metal hydroxide, defined as a mole amount of the second alkali metal hydroxide added to the first reaction product mixture per hour per mole of the cellulose in cellulose pulp, is 2.8 to 7.5 [mol/mol·hr].

6. The method for producing a hydroxyalkyl alkyl cellulose according to claim 1, wherein the cellulose pulp has an intrinsic viscosity of from 600 to 2,500 ml/g.

7. The method for producing a hydroxyalkyl alkyl cellulose according to claim 1, wherein a mole ratio of the hydroxyalkylating agent to the cellulose in the cellulose pulp is from 0.5 to 2.0.

8. The method for producing a hydroxyalkyl alkyl cellulose according to claim 1, wherein the hydroxyalkyl alkyl cellulose is selected from the group consisting of hydroxypropyl methyl cellulose, hydroxypropyl ethyl cellulose, hydroxyethyl methyl cellulose, and hydroxyethyl ethyl cellulose.

* * * * *